US006923563B1

(12) United States Patent
Barber et al.

(10) Patent No.: US 6,923,563 B1
(45) Date of Patent: Aug. 2, 2005

(54) MOVABLE HEADLIGHT UNIT FOR USE ON MOTOR VEHICLE

(76) Inventors: James O. Barber, 2245 Webbwood Rd., Riverton, WY (US) 82501; Barbara A. Barber, 2245 Webbwood Rd., Riverton, WY (US) 82501

( * ) Notice: Subject to any disclaimer, the term of this patent is extended or adjusted under 35 U.S.C. 154(b) by 83 days.

(21) Appl. No.: 10/625,760

(22) Filed: Jul. 24, 2003

(51) Int. Cl.[7] ............................................... F21V 19/02
(52) U.S. Cl. ...................... 362/526; 362/467; 362/272; 362/286
(58) Field of Search ................................ 362/513, 512, 362/428, 523–537, 504, 467, 272, 286

(56) References Cited

U.S. PATENT DOCUMENTS

| | | | |
|---|---|---|---|
| 3,456,153 A | 7/1969 | Smith | 327/443 |
| 3,648,647 A | 3/1972 | Joy | 116/205 |
| 3,752,408 A | 8/1973 | Tixier | 362/276 |
| 4,722,030 A * | 1/1988 | Bowden | 362/493 |
| 5,063,481 A | 11/1991 | Martin | 362/528 |
| 5,171,083 A * | 12/1992 | Rich | 362/526 |
| 5,182,502 A | 1/1993 | Slotkowski et al. | 315/159 |
| 5,270,906 A | 12/1993 | Kircher | 362/523 |
| 5,303,126 A | 4/1994 | Taniuchi | 362/517 |
| 5,396,407 A | 3/1995 | Taniuchi | 362/518 |
| 5,490,046 A * | 2/1996 | Gohl et al. | 362/35 |
| 6,033,099 A * | 3/2000 | Kulis | 362/527 |
| 6,648,494 B2 * | 11/2003 | Sugimoto et al. | 362/526 |
| 6,761,473 B2 * | 7/2004 | Hayami | 362/526 |

* cited by examiner

Primary Examiner—Thomas M. Sember
Assistant Examiner—Bao Q. Truong
(74) Attorney, Agent, or Firm—Donald R. Schoonover

(57) ABSTRACT

A headlight unit that is adapted for use on a motor vehicle, such as a land vehicle, can be moved from one orientation with respect to the road into other orientations that are angularly spaced apart from the first orientation in response to movement of a control switch inside the motor vehicle.

2 Claims, 2 Drawing Sheets

MOVABLE HEADLIGHT UNIT FOR USE ON MOTOR VEHICLE

BACKGROUND OF THE INVENTION

1. Field of the Invention

The present invention relates to the general art of motor vehicles, and to the particular field of accessories for the lights of motor vehicles.

2. Discussion of the Related Art

Many land vehicles are used in a wide range of environmental conditions. These conditions range from clear, lighted roadways, to foggy and low visibility conditions. Often, these vehicles travel great distances under adverse conditions. As is taught in the art, a headlight that is oriented to be effective under clear conditions may not be as effective under foggy conditions. Thus, many vehicles have two separate headlight systems, one for clear environmental conditions and one for fog. Since not all fog conditions are alike, the fog lights on many vehicles are not as effective as possible.

Still further, some vehicles are used to carry heavy items. These items are often placed in the rear of the vehicle. If a vehicle is loaded in this manner, the front end of the vehicle may be raised with respect to the rear end. This may orient the headlights of the vehicle upward with respect to an ideal orientation. Such upward orientation may cause the light from the headlights to shine into the eyes of oncoming drivers. This is not a desirable situation.

Therefore, there is a need for a headlight unit for a motor vehicle that can be moved as necessary from inside the vehicle.

If a motor vehicle is loaded with various loads, the front end of the vehicle may reorient based on the load being carried. Thus, the amount of reorientation of the headlights of the vehicle may be a function of the load being carried by the vehicle.

Therefore, there is a need for a headlight unit for a motor vehicle that can be moved as necessary from inside the vehicle and which can be moved into a plurality of orientations.

Anyone who has ever driven at night has experienced the annoyance of having the headlights of an oncoming driver in the opposite lane shine into their eyes. This is often caused by the other driver having his or her high beams on. Many people have an impulse to turn on their high beams in response to this situation. Some State driver manuals specifically address this situation and specifically state that the driver should not turn on his high beams in response to this situation. With the emphasis on avoiding road rage situations, this reaction especially should be avoided.

Thus, there is a need for a headlight unit for a motor vehicle that can be moved as necessary from inside the vehicle to address a number of situations, but which is moved in a manner that will deter an impulse to turn the headlight into a high situation in response to another driver's lights shining into the driver's eyes.

PRINCIPAL OBJECTS OF THE INVENTION

It is a main object of the present invention to provide a headlight unit for a motor vehicle that can be moved as necessary from inside the vehicle.

It is another object of the present invention to provide a headlight unit for a motor vehicle that can be moved as necessary from inside the vehicle and which can be moved into a plurality of orientations.

It is another object of the present invention to provide a headlight unit for a motor vehicle that can be moved as necessary from inside the vehicle to address a number of situations, but which is moved in a manner that will deter an impulse to turn the headlight into a high situation in response to another driver's lights shining into the driver's eyes.

SUMMARY OF THE INVENTION

These, and other, objects are achieved by a headlight unit that is used on a motor vehicle and which includes a headlight that can be moved into a variety of orientations based on the position of a control switch that is located inside the motor vehicle.

The headlight unit can thus be moved into an orientation that is most effective for the loading of the vehicle and/or for environmental conditions.

BRIEF DESCRIPTION OF THE DRAWING FIGURES

DETAILED DESCRIPTION OF THE PREFERRED EMBODIMENT

Other objects, features and advantages of the invention will become apparent from a consideration of the following detailed description and the accompanying drawings.

Figure 1:
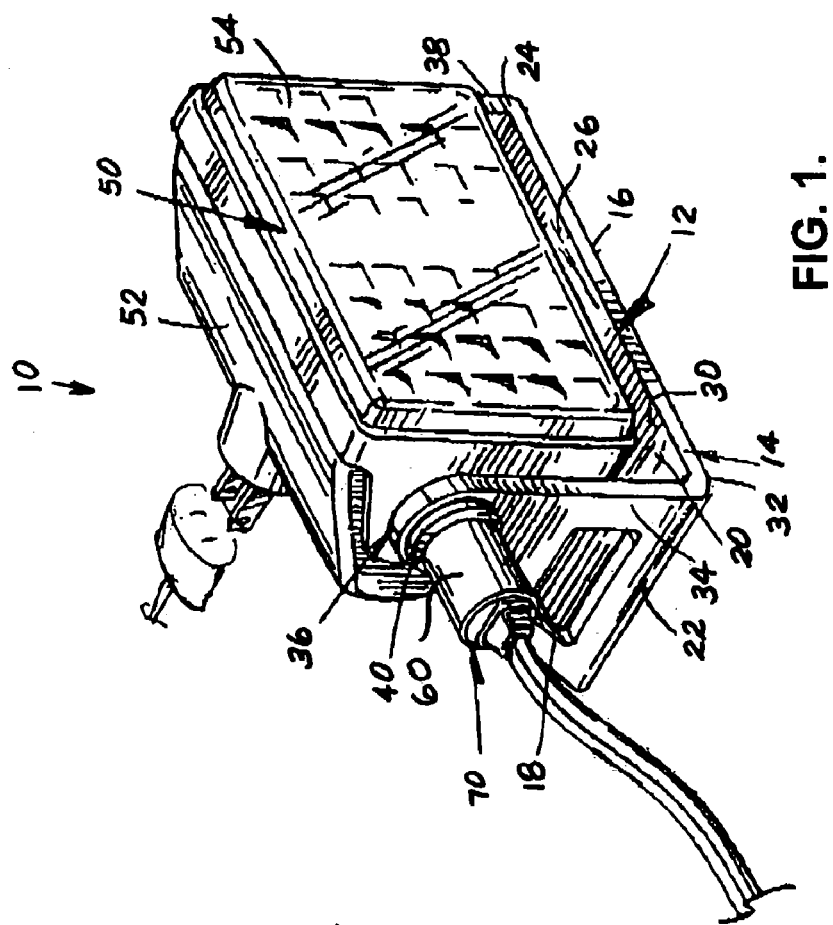
FIG. 1 is a perspective view of a headlight unit of a motor vehicle that is moved under the control of a control switch located inside the motor vehicle.
Figure 2:
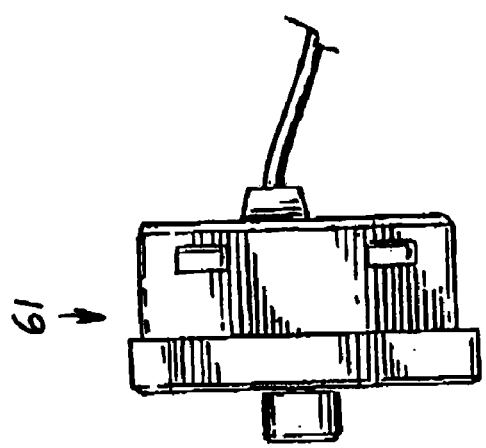
FIG. 2 is a front elevational view of a control switch that is located inside a motor vehicle and which is used to control the orientation of the headlights of the motor vehicle.
Figure 3:
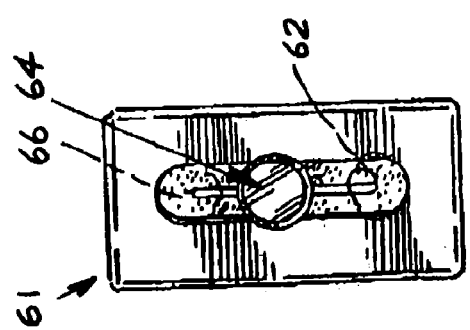
FIG. 3 is a side elevational view of the control switch shown in FIG. 2.

Referring to the Figures, it can be understood that the present invention is embodied in a headlight unit 10 for use on a land vehicle. The headlight unit is shown in FIGS. 1–3 and comprises a U-shaped support bracket 12 adapted to be mounted on a frame of a land vehicle. Bracket 12 will be located in the light well generally found on land vehicles such as automobiles. This light well is not shown as those skilled in the art will understand the structure and interaction of the structure with the headlight 12 based on their knowledge and the teaching of this disclosure. Support bracket 12 includes a bight section 14 which has a first side edge 16, a second side edge 18, and a transverse axis 20 which extends between the first side edge 16 and the second side edge 18. The bight section 14 further includes a first end edge 22, a second end edge 24, and a longitudinal axis 26 which extends between the first end edge 22 and the second end edge 24. The bight section 14 further includes a first surface 30 and a second surface 32.

A first leg 34 is located on the first end edge 22 of the bight section 14. The first leg 34 is triangular and has an apex 36 that is spaced apart from the first surface 30 of the bight section 14. A second leg 38 is located on the second end edge 24 of the bight section 14. While not shown in FIG. 1, the second leg 38 is identical to the first leg 34 and thus is triangular with an apex spaced apart from the first surface 30 of the bight section 14.

A first pivot connection 40 is located on the first leg 34 adjacent to the apex 36 of the first leg 34 and a second pivot connection, identical to the first pivot connection 40, is located on the second leg 38 adjacent to the apex of the second leg 38.

A headlight 50 is pivotally mounted on the support bracket 12 by the first pivot connection 40 and second pivot connection. The headlight 50 includes a housing 52 and a first surface 54, which is translucent and which is adapted to transmit light therethrough in the manner of a headlight. Headlight 50 is movable between a first orientation 50a indicated in FIG. 4 with respect to the bight section 14 of the support bracket 12 in which the first surface 54 is oriented essentially perpendicular to an inner surface of the bight section 14 and a second orientation 50b with respect to the bight section 14 of the support bracket 12 in which the first surface 54 is oriented at an oblique angle, θ, to the first surface 30 of the bight section 14. In one form of the invention, the angle θ is in a range of 0° to 30°.

A motor 60 is mounted on the first leg 34 of the support bracket 12. The motor 60 is connected to the headlight 50 to move the headlight 50 when the motor 60 is activated. The particular connection between the motor 60 and the headlight 50 is not important to the present invention and thus will not be discussed in detail. Those skilled in the art will be able to connect a motor to a headlight in order to carry out the purposes of the present invention based on their knowledge and the teaching of this disclosure.

A control switch 61 is shown in FIGS. 2 and 3 and is adapted to be mounted inside the land vehicle, preferably on the dashboard of the vehicle near a driver. Control switch 61 has a plurality of positions. These positions include a "down" position 62, at "off" position 64, and an "up" position 66. Control switch 61 electrically connects the motor 60 to a power source in the land vehicle, such as the vehicle battery, when the control switch 61 is in the "down" position 62, or is in the "up" position 66 with the headlight 50 being oriented with respect to the bight section 14 of the support bracket 12 in a first orientation when the control switch 61 is in the "down" condition 62, in a second orientation when the control switch 61 is in the "off" position 64, and in a third orientation when the control switch 61 is in the "up" position 66. The orientations of the headlight 50 are angularly spaced apart from each other as discussed above.

Figure 4:
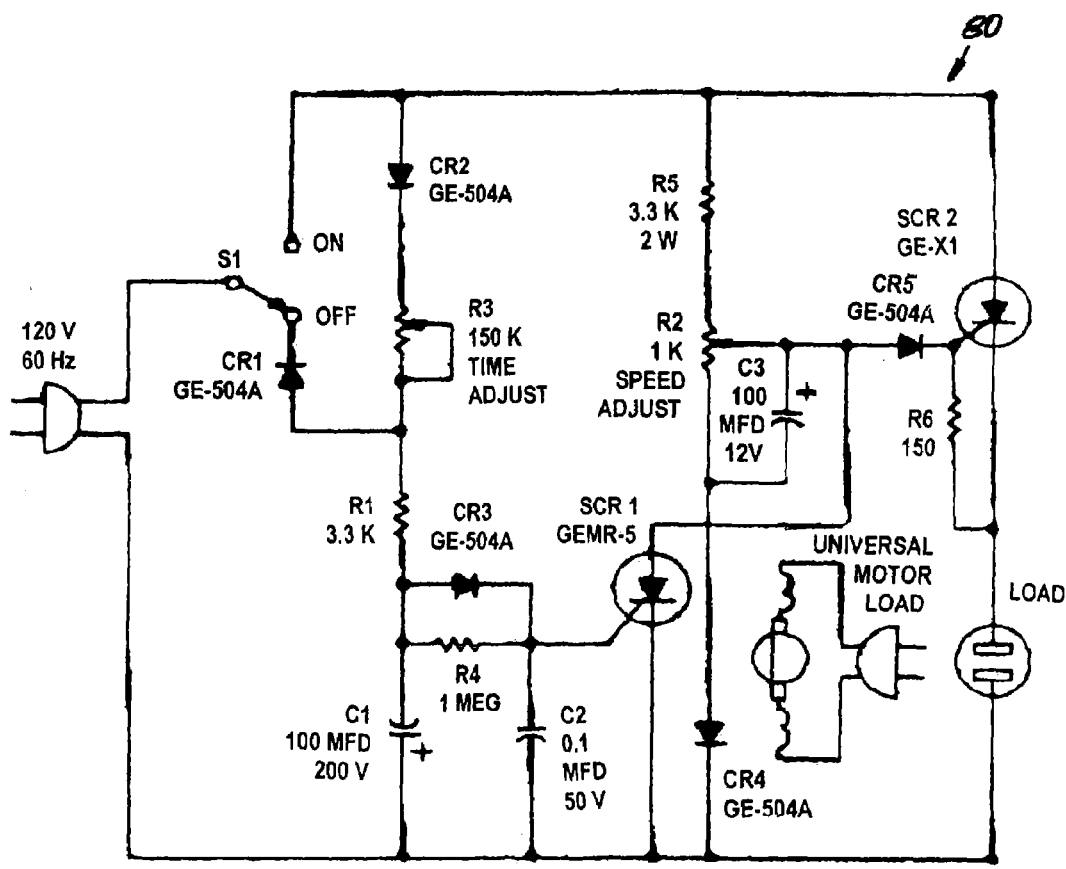
FIG. 4 is a circuit that can be used to control the orientation of the headlight unit via the control switch.

The particular circuit used to connect the control switch 61 to the headlight 50 can be designed by those skilled in the art based on the teaching of the present disclosure. However, a motor control circuit 80 is shown in FIG. 4. When a time delay expires, SCR1 conducts and removes the gate signal from SCR2, which stops the motor 60. Stopping the motor 60 will place the headlight 50 in a position that corresponds to the stopping point of the motor 60 and such time is set to move the headlight 50 into the orientation which corresponds to the selected position of the control switch 61. It is understood that while certain forms of the present invention have been illustrated and described herein, it is not to be limited to the specific forms or arrangements of parts described and shown.

What is claimed is:

1. A headlight unit for use on a land vehicle comprising:
   a) a U-shaped support bracket adapted to be mounted on a frame of a land vehicle, said support bracket including
      (1) a bight section having a first side edge, a second side edge, a transverse axis extending between the first side edge and the second side edge, a first end edge, a second end edge, a longitudinal axis extending between the first end edge and the second end edge, a first surface, and a second surface,
      (2) a first leg on the first end edge of the bight section, the first leg being triangular with an apex spaced apart from the first surface of the bight section,
      (3) a second leg on the second end edge of the bight section, the second leg being triangular with an apex spaced apart from the first surface of the bight section,
      (4) a first pivot connection on the first leg adjacent to the apex of the first leg, and
      (5) a second pivot connection on the second leg adjacent to the apex of the second leg;
   b) a headlight pivotally mounted on said support bracket by the first and second pivot connections, said headlight including a housing and a first headlight surface which is translucent and which is adapted to transmit light therethrough, said headlight being movable between a first orientation with respect to the bight section of said support bracket in which the first headlight surface is oriented essentially perpendicular to the first surface of the bight section and a second orientation with respect to the bight section of said support bracket in which the first headlight surface is oriented at an oblique angle to the inner surface of the bight section;
   c) a motor mounted on the first leg of said support bracket, said motor being connected to said headlight to move said headlight when said motor is activated;
   d) a control switch adapted to be mounted inside the land vehicle, said control switch having a plurality of positions, including an "off" position, at least one "intermediate" position and a "high" position, said control switch electrically connecting said motor to a power source in the land vehicle when in the "intermediate" position, or in the "high" position with the headlight being oriented with respect to the bight section of said support bracket in a first orientation when said control switch is in the "off" condition, in a second orientation when said control switch is in the "intermediate" position and in a third orientation when said control switch is in the "high" position, the orientations of said headlight being angularly spaced apart from each other; and
   e) a delay circuit electrically connected to said motor to delay activation and movement of said headlight for a preset time after said control switch is moved from one of the plurality of positions into another of the plurality of positions.

2. The headlight unit as described in claim 1 wherein a total angular spacing between the first orientation of said headlight and the third orientation of said headlight is in a range of 20° to 30°.

* * * * *